United States Patent
Gupta et al.

(10) Patent No.: US 6,380,791 B1
(45) Date of Patent: Apr. 30, 2002

(54) CIRCUIT INCLUDING SEGMENTED SWITCH ARRAY FOR CAPACITIVE LOADING REDUCTION

(75) Inventors: Shivani Gupta, Milpitas; Christina Phan, San Jose, both of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/572,022

(22) Filed: May 16, 2000

(51) Int. Cl.[7] ................................................ G05F 1/10
(52) U.S. Cl. ................................. 327/382; 327/538
(58) Field of Search ................................. 327/540, 538, 327/344, 339, 382

(56) References Cited

U.S. PATENT DOCUMENTS

| | | | |
|---|---|---|---|
| 3,742,384 A | * 6/1973 | Breitzmann et al. | 331/111 |
| 4,479,097 A | * 10/1984 | Lason et al. | 331/111 |
| 5,703,529 A | * 12/1997 | Ghaffaripour et al. | 330/51 |
| 5,856,756 A | * 1/1999 | Sarahara et al. | 327/540 |
| 5,942,809 A | * 8/1999 | Hashimoto | 327/540 |
| 6,078,210 A | * 6/2000 | Uchida et al. | 327/530 |

* cited by examiner

Primary Examiner—Toan Tran
Assistant Examiner—Linh Nguyen
(74) Attorney, Agent, or Firm—Girard & Equitz LLP

(57) ABSTRACT

An integrated circuit having at least one segmented array of switches, wherein the root node of each segmented array of switches is a node whose potential varies with time during operation. Each segmented switch array includes switches connected between nodes having a tree structure. The nodes include the root node and additional nodes of at least two different degrees relative to the root node. By providing a segmented array (rather than a non-segmented array) of switches at a node, the total load capacitance (including parasitic capacitance) at the node is reduced in accordance with the invention. In preferred embodiments, the invention is an analog integrated circuit having a first node at which the potential varies rapidly, and a segmented array of switches whose root node is the first node. Another aspect of the invention is a method for designing an integrated circuit to have reduced load capacitance (e.g., load capacitance due to parasitic capacitance) at at least one sensitive node, including the steps of identifying a sensitive node of a preliminary design for the circuit, wherein an array of switches is coupled to the sensitive node; and determining a refined design for the circuit in which the array is replaced by a segmented switch array comprising switches connected between nodes having a tree structure, wherein the nodes include a root node, and the root node is the sensitive node.

22 Claims, 3 Drawing Sheets

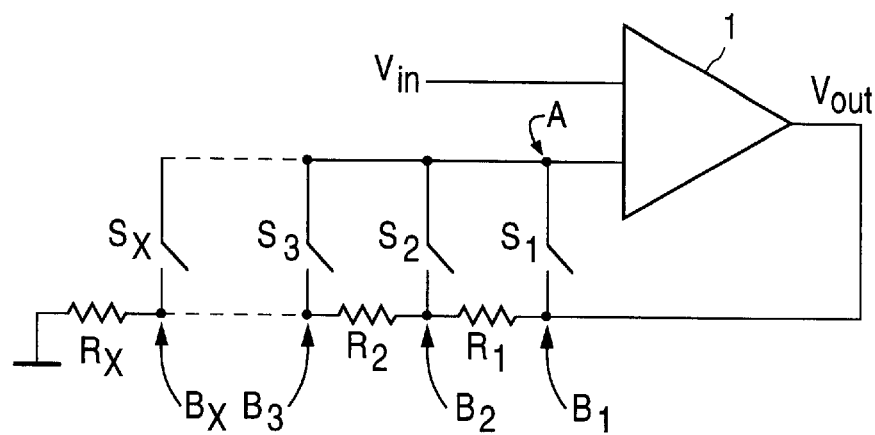
FIG. 1
(PRIOR ART)
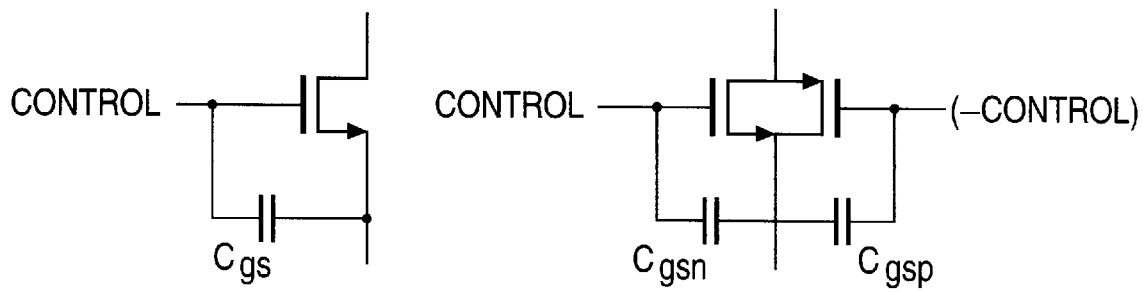
FIG. 2  FIG. 3
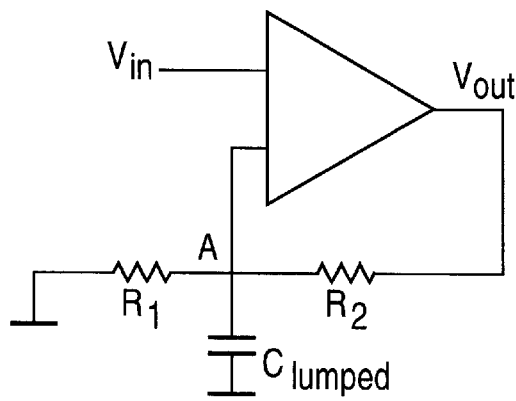
FIG. 4

CIRCUIT INCLUDING SEGMENTED SWITCH ARRAY FOR CAPACITIVE LOADING REDUCTION

BACKGROUND OF THE INVENTION

1. Field of the Invention

The present invention relates to circuitry (including at least one segmented switch array) for reducing total load capacitance (including parasitic capacitance) at one or more nodes of an integrated circuit. In a class of embodiments, the invention is an analog integrated circuit which operates at high speed (in the sense that the potential at a node thereof varies rapidly) and has a segmented array of switches (rather than a conventional non-segmented array) coupled to the node, to reduce capacitive loading at the node.

2. Description of the Related Art

In integrated circuits, a large total load capacitance at one node can pose a potential stability problem, especially in cases in which the integrated circuit has an analog design and operates at high speed (in the sense that the potential at the node varies rapidly over time). A large total load capacitance can result from parasitic capacitances that add up to a significant amount of capacitance, or it can result from a large capacitor in the design.

Analog integrated circuits that operate at high speed (as well as other integrated circuits) are subject to the problem of large parasitic capacitances, especially at nodes where the potential varies rapidly as a function of time. For example, in an integrated circuit including the conventional multiple-gain block shown in FIG. 1, node A is subject to the problem of large parasitic capacitance. In FIG. 1, amplifier 1 has a first input coupled to receive input potential "Vin," a second input (Node A) coupled to switches $S_1$–$S_x$ (where "x" is an integer greater than three), and an output (at which the amplifier asserts output potential "Vout"). Switch $S_1$ is coupled between Nodes A and B1, switch $S_2$ is coupled between Nodes A and B2, switch $S_3$ is coupled between Nodes A and B3, switch $S_x$ is coupled between Node A and Node Bx, switches $S_4$ through $S_{x-1}$ (if present) are coupled in parallel between Node A and nodes between Nodes B3 and Bx, resistor $R_1$ is coupled between Nodes B1 and B2, resistor $R_2$ is coupled between Nodes B2 and B3, resistors $R_3$ through $R_{x-1}$ (if present) are coupled in series between Nodes B3 and Bx, and resistor $R_x$ is coupled between Node Bx and either the bottom rail or some quiet DC level. The array of switches and resistors causes amplifier 1 to output any selected one of multiple values of output voltage Vout at the amplifier's output node.

Many variations on the FIG. 1 design are possible, including variations with only two or three switches connected in parallel between the amplifier and the series-connected resistors.

FIG. 2 is a schematic diagram of an NMOS transistor which implements each of switches $S_1$–$S_x$ (of FIG. 1) in a typical implementation of FIG. 1. The control signal for the switch ("CONTROL") is asserted to the gate of the NMOS transistor. The NMOS transistor of FIG. 2 has a parasitic gate-to-source capacitance (which is indicated by the symbol $C_{gs}$ in FIG. 2).

Some designs require only N-channel switches (switches implemented as NMOS transistors) but most others require switches implemented as transmission gates (each including an NMOS and a PMOS transistor) for good transfer of signals. FIG. 3 is a schematic diagram of such a transmission gate, consisting of an NMOS transistor and a PMOS transistor coupled together as shown (with the drain of the NMOS transistor connected to the source of the PMOS transistor, and the source of the NMOS transistor connected to the drain of the PMOS transistor), which can be used to implement each of switches $S_1$–$S_x$ (of FIG. 1) in another typical implementation of FIG. 1. The control signal for the switch ("CONTROL") is asserted to the gate of the NMOS transistor, and the inverse of the control signal ("–CONTROL") is asserted to the PMOS transistor's gate. In FIG. 3, the NMOS transistor has a parasitic gate-to-source capacitance (indicated by the symbol $C_{gsn}$ in FIG. 3) and the PMOS transistor has a parasitic gate-to-drain capacitance (indicated by the symbol $C_{gsp}$ in FIG. 3). Typically, $C_{gs}$, $C_{gsn}$ and $C_{gsp}$ are not equal, and a switch implemented as in FIG. 3 has at least twice the parasitic capacitance of a switch implemented as in FIG. 2.

FIG. 4 is a lumped equivalent model of the FIG. 1 circuit. The total capacitance of the switches $S_1$–$S_x$ (which is the sum of the parasitic capacitances $C_{gs}$ of transistors implementing them) at node A is represented as lumped capacitance $C_{lumped}$ in FIG. 4.

Writing the Kirchoff's Current Law equation at node A gives $$Vin \cdot \left[\frac{1}{R_1} + \frac{1}{R_2} + s \cdot Clumped\right] = Vout \cdot \left[\frac{1}{R_2}\right]$$

where R2 represents the resistance between Node A and the amplifier's output node, R1 represents the resistance between Node A and the bottom rail (or other node at a quiet DC level), and "s" has units of frequency.

Solving for Vin/Vout gives $$\frac{Vin}{Vout} = \left[\frac{\frac{R_1}{(R1R2Clumped)}}{s + \left(\frac{R1 + R2}{R1R2Clumped}\right)}\right]$$

The form of the denominator of this transfer function $$\left\} s + \frac{R1 + R2}{R1R2Clumped}\right\{$$

implies that there is a pole located at $$wp = -\left[\frac{R1 + R2}{R1R2Clumped}\right]$$

The pole frequency is $$fp = \frac{-1}{2\pi} \cdot \left[\frac{R1 + R2}{R1R2Clumped}\right]$$

It can be seen from FIG. 1 that if there are too many switches $S_1$–$S_x$, there can be significant capacitive loading at node A of the amplifier.

With reference to FIG. 1 and its equivalent (FIG. 4), due to the presence of the pole related to the lumped capacitance $C_{lumped}$ (where $C_{lumped}$ depends on the parasitic capacitances of the switches of the FIG. 1 circuit), if the number of gain steps in an implementation of the FIG. 1 circuit is large (i.e., if the index "x" is large), and the lumped capacitance $C_{lumped}$ is large, the pole can be at a low enough frequency so that it interferes with the transient response of the amplifier. This interference can cause ringing of the amplifier and can result in nonlinearities in the system, thus degrading the systems S-to-N performance (where "S" represents signal and "N" represents noise plus distortion).

In accordance with the present invention, a switch array (coupled to a node of an integrated circuit) is implemented in such a way as to reduce the total load capacitance at the node (including by reducing the parasitic capacitances of the switches), thereby reducing the problems (noted in the preceding paragraph) which would otherwise result from conventional implementation of the switch array.

SUMMARY OF THE INVENTION

In a class of embodiments, the invention is an integrated circuit having at least one node at which the potential varies with time (during operation) and which is the root node of a segmented array of switches. In some embodiments, the circuit includes a single segmented array of switches. In other embodiments, the circuit includes a least two segmented arrays of switches (each having a different root node).

Each segmented switch array comprises switches connected between nodes having a tree structure. The nodes include the root node and additional nodes of at least two different degrees (D) relative to the root node. The array has at least two primary segments (each including a switch and a node of degree D=1) connected in parallel between the first node and additional circuitry (or a second node). At least one primary segment has multiple secondary segments (each including a switch and a node of degree D=2) connected in parallel between one of the nodes of degree D=1 and the additional circuitry (or second node).

By providing a segmented array (rather than a non-segmented array) of switches at a node, the total load capacitance (including parasitic capacitance) at the node is reduced in accordance with the invention. In some embodiments, the invention is an analog integrated circuit which operates at high speed (in the sense that the circuit has a first node at which the potential varies rapidly) and which has a segmented array of switches whose root node is the first node.

Another aspect of the invention is a method for designing an integrated circuit to have reduced load capacitance (e.g., load capacitance due to parasitic capacitance) at at least one sensitive node, including the steps of: (a) identifying a sensitive node of a preliminary design for the circuit, wherein the preliminary design specifies that an array of switches is coupled to the sensitive node; and (b) determining a refined design for the circuit in which the array is replaced by a segmented switch array comprising switches connected between nodes having a tree structure, wherein the nodes include a root node, and the root node is the sensitive node. In preferred embodiments, the segmented switch array has at least two primary segments, each of the primary segments includes a primary switch and a node of a first degree (a node having degree D=1 relative to the root node), and at least one of the primary segments has multiple secondary segments, each of the secondary segments including a secondary switch and a node of a second degrees (a node having degree D=2 relative to the root node).

In a class of embodiments, the invention is an integrated circuit including at least one multiple-gain block including an amplifier having an input terminal, an array of resistors, and a segmented array of switches between the input terminal and the array of resistors, wherein the segmented array of switches is implemented so as to reduce total load capacitance at the input terminal to a desired level, thereby significantly improving the stability of the multiple-gain block. In other embodiments, the invention is an integrated circuit which includes a segmented array of switches, wherein the segmented array has a first number of states and a root node which is a sensitive node of the circuit, wherein replacement of the segmented array of switches with a non-segmented array would increase total load capacitance at the sensitive node thereby causing instability or gain reduction.

BRIEF DESCRIPTION OF THE DRAWINGS

FIG. 1 is a schematic diagram of a portion of a conventional integrated circuit having a node (node A) to which an array of switches is coupled.

FIG. 2 is a schematic diagram of a transistor which implements each switch of FIG. 1, in a first implementation of the FIG. 1 circuit.

FIG. 3 is a schematic diagram of a circuit which implements each switch of FIG. 1, in a second implementation of the FIG. 1 circuit.

FIG. 4 is a lumped equivalent model of the FIG. 1 circuit.

DETAILED DESCRIPTION OF THE PREFERRED EMBODIMENTS

The inventors have recognized that an effective solution to the problem of reducing parasitic capacitance at sensitive nodes, such as the input of the amplifier of a multiple-gain block of an integrated circuit (such as that of FIG. 1), is to use segmentation in the switch array whose state determines the gain.

Figure 5:
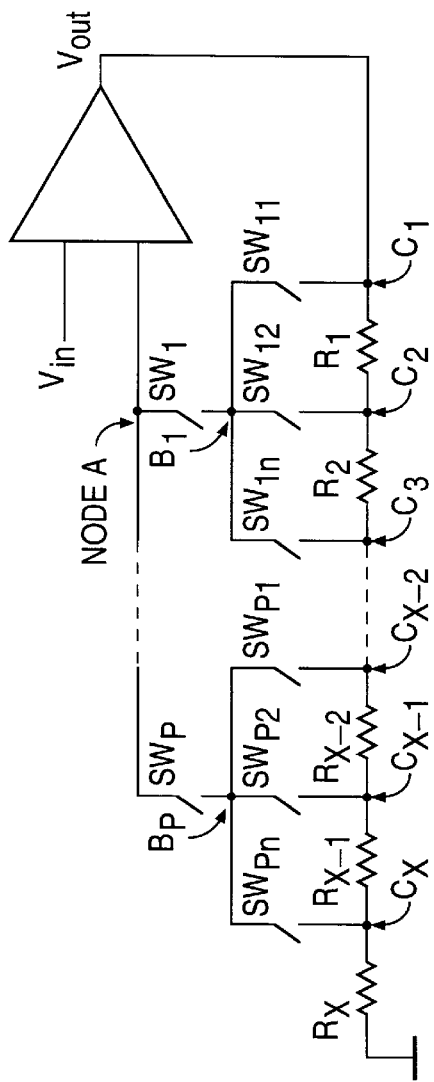
FIG. 5 is a schematic diagram of a portion of an integrated circuit which is a preferred embodiment of the invention and which has a node (node A) to which a segmented array of switches is coupled.

A first preferred embodiment of the invention will be described with reference to FIG. 5. The circuit of FIG. 5 is identical to that of FIG. 1, except in that the conventional array of switches (in FIG. 1) is replaced (in FIG. 5) by a segmented array of switches $SW_1, \ldots, SW_p, SW_{11}, SW_{12}, \ldots, SW_{1m}, \ldots, SW_{p1}, \ldots, SW_{p2}, \ldots, SW_{pn}$. The segmented array of switches has "p" primary segments (where p is an integer greater than 1) connected in parallel between Node A and an array of resistors ($R_1$–$R_x$). Each primary segment includes a primary switch (one of switches $SW_1$–$SW_p$) and at least two secondary switches (e.g., switches $SW_{11}$–$SW_{1m}$ or switches $SW_{p1}$–$SW_{pn}$, where m and n are integers greater than 1) connected in parallel between the primary switch and the array of resistors. Each primary switch is connected between Node A and one of Nodes B1–Bp. Each secondary switch is connected between one of Nodes B1 Bp and one of Nodes C1–Cx. Resistor $R_1$ is connected between Nodes C1 and C2, resistor $R_2$ is connected between Nodes C2 and C3, resistor $R_{x-2}$ is connected between Nodes Cx-2 and Cx-1, resistor $R_x$ is connected between Nodes Cx-1 and Cx, and any additional resistors $R_{x-3}$–$R_3$ are connected between Nodes C3 and Cx-2.

More generally, the inventive circuit has a segmented array of switches connected between a first node (the array's root node) and additional circuitry (e.g., an array of resistors) or a second node, in order to reduce the load capacitance at the first node. The segmented array comprises switches connected between a set of nodes having a tree structure. The set of nodes includes the first (root) node and additional nodes of at least two different degrees (D) relative to the first node. The array has multiple primary segments (each including a switch and a node of degree D=1) connected in parallel between the first node and the additional circuitry or second node. At least one primary segment has multiple secondary segments (each including a switch and a node of degree D=2) connected in parallel between one of the nodes of degree D=1 and the additional circuitry or second node. Optionally, at least one secondary segment has multiple tertiary segments (each including a switch and a node of degree D=3) connected in parallel between one of the nodes of degree D=2 and the additional circuitry or second node, and so on (optionally the array includes segments of higher than tertiary order with additional switches and nodes of degree. D>3).

Figure 6:
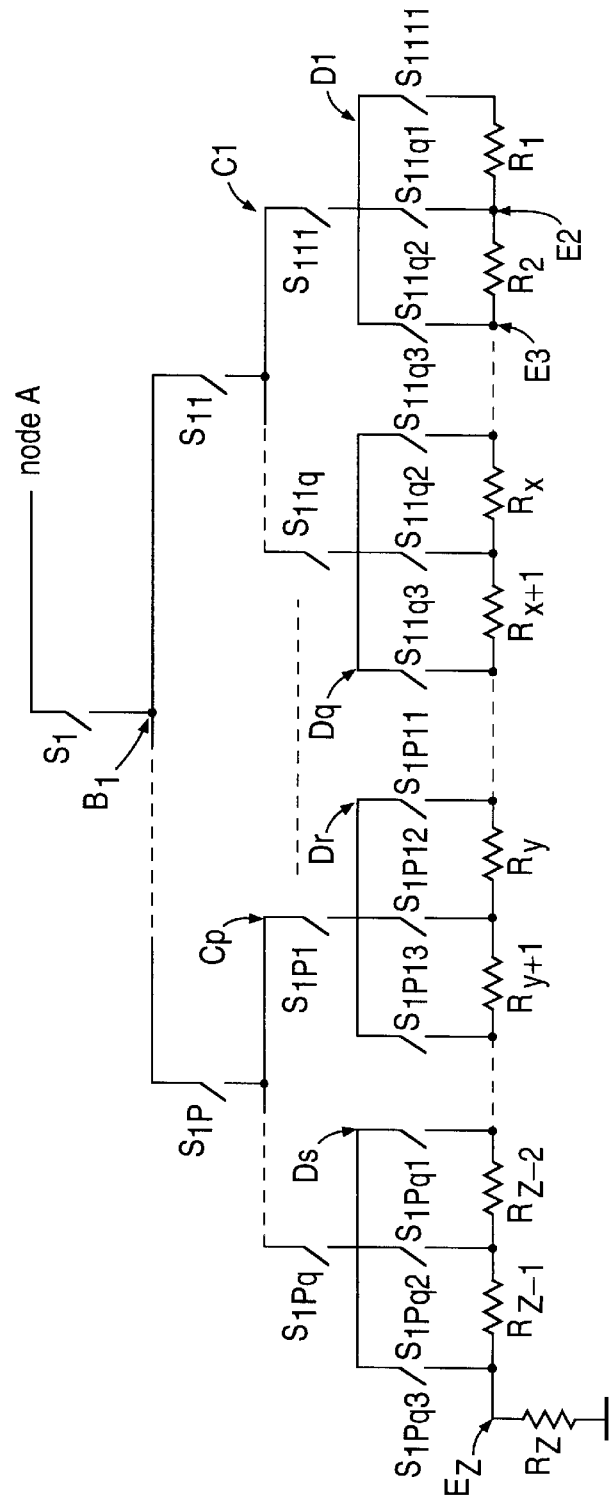
FIG. 6 is a schematic diagram of a portion of a second preferred embodiment of the inventive integrated circuit, which has a node (node A) to which a segmented array of switches is coupled.

For example, in FIG. 6, a segmented array of switches is connected between Node A and additional circuitry (including resistors $R_1$–$R_z$ shown in FIG. 6 and other elements not shown in FIG. 6). Only a first primary segment (including switch $S_1$) of the segmented array is shown, but other primary segments (not shown in FIG. 6) identical to the first primary segment are included. The first primary segment includes primary switch $S_1$, secondary switches $S_{11}$–$S_{1p}$, tertiary switches $S_{111}$–$S_{11q}$, ..., $S_{1p1}$–$S_{1pq}$, and a fourth tier of switches $S_{1111}$, $S_{1112}$, $S_{1113}$, ..., $S_{11p1}$, $S_{11q2}$, $S_{11q3}$, ..., $S_{1p11}$, $S_{1p12}$, $S_{1p13}$, ..., $S_{1pq1}$, $S_{1pq2}$, and $S_{1pq3}$. Switch $S_1$ is connected between Node B1 (having degree D=1) and Node. A, each of switches $S_{11}$–$S_{1p}$ is connected between one of Nodes C1–Cp (each having degree D=2) and Node B1, each of switches $S_{111}$–$S_{11q}$, ..., $S_{1p1}$–$S_{1pq}$ is connected between one of Nodes D1–DQ, ..., and Dr–Ds (each having degree D=3) and one of Nodes C1–Cp, and each of switches $S_{1111}$, $S_{1112}$, $S_{1113}$, ..., $S_{11q1}$, $S_{11q2}$, $S_{11q3}$, ..., $S_{1p11}$, $S_{1p12}$, $S_{1p13}$, ..., $S_{1pq1}$, $S_{1pq2}$ and $S_{1pq3}$ is connected between one of Nodes E1, E2, E3, ..., and Ez (each having degree D=4) and one of Nodes D1–DQ, ..., and Dr–Ds. Resistors $R_1$–$R_{z-1}$ are connected in series between nodes E1 and Ez, and resistor $R_z$ is connected between node Ez and the bottom rail (or other node at a quiet DC level).

Figure 9:
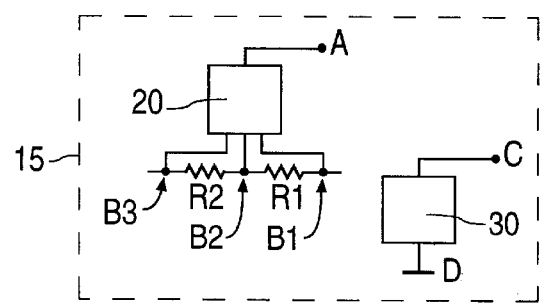
FIG. 9 is a block diagram of a portion of an embodiment of the inventive integrated circuit.

For another example, integrated circuit 15 of FIG. 9 has a first segmented array 20 of switches connected between node A (array 20's root node) and additional circuitry (comprising a resistor R1 between nodes B1 and B2, and resistor R2 between nodes B2 and B3), and a second segmented array 30 of switches connected between node C (array 30's root node) and node D, in order to reduce the load capacitance at each of nodes A and C. Each of segmented arrays 20 and 30 comprises switches connected between a set of nodes having a tree structure, and each of segmented arrays 20 and 30 can be implemented as the array of switches of FIG. 5 or FIG. 6.

With reference again to the invention as most broadly defined, if one assumes that a first segmented array of switches is to be coupled to a first node in accordance with the invention, the first array has a predetermined total number of states, and implementation of the first array with a specific number of levels (tiers) of segmentation reduces the parasitic capacitance at the first node to a first value, then the parasitic capacitance at the first node can be further reduced (to a value less than the first value) by replacing the first array with a second segmented array having the same states but an increased number of segmentation levels. For example, the FIG. 5 array has "p" primary segments, two levels of segmentation (nodes of two different degrees, D=1 and D=2, relative to node A), and a set of selectable states (each state of the array being determined by the states of the individual switches). If the FIG. 5 array is unable to reduce the total parasitic capacitance at node A to a desired level, then another array (having the same total number of states but having more than two levels of segmentation) should be used in place of the FIG. 5 array.

With reference to the multiple-gain blocks of FIGS. 1 and 5, replacing the original number of switches in FIG. 1 ("x" switches $S_1$–$S_x$) with a smaller number of primary segments in FIG. 5 ("p" segments, each including one of switches $SW_1$–$SW_p$, where p is less (and typically much less) than x) in accordance with the invention, significantly reduces the total parasitic capacitance at node A. As a result of this parasitic capacitance reduction, the pole (of the transfer function that determines the relevant block's output potential $V_{out}$ relative to input potential $V_{in}$) is pushed out to a higher frequency, preferably outside the bandwidth of the system, thus making it possible to implement the system as a stable system.

In general, preferred embodiments of the inventive circuit reduce the total load capacitance at a node (the root node of a segmented array of switches included in the circuit) to a level sufficiently low that circuit's transfer function is modified (e.g., by pushing a pole thereof to a higher frequency outside the bandwidth of the system) so as to achieve a desired operating characteristic (e.g., so as to cause the circuit to be a stable system).

To operate the FIG. 5 circuit, decoding logic is coupled to switches $SW_1$–$SW_p$ and $SW_1$–$SW_{pn}$, to provide control signals for each of the switches. Although the segmented array of FIG. 5 has a total of "Z" switches (where Z is an integer), it has less than $2^Z$ selectable states (where each state determines a different value of the ratio Vout/Vin). The decoding logic can be implemented with inputs for "pn" binary bits, $2^Z$ outputs, and circuitry for automatically selecting ones of switches $SW_1$–$SW_p$ depending on which of switches $SW_{11}$–$SW_{pn}$ are determined by the input bits. In order to operate segmented array of FIG. 6 (assuming the FIG. 6 array has the same total number of states as the FIG. 5 array), decoding logic that is more complex (than the decoding logic required to operate the FIG. 5 array) must be coupled to switches $S_1$, $S_{11}$–$S_{1p}$, $S_{111}$–$S_{1pq}$, and $S_{1111}$–$S_{1pq3}$ of FIG. 6. This can be appreciated by recognizing that, to turn on the first tap of FIG. 5 (with all switches off except switches $SW_1$ and $SW_{11}$), decoding logic of a first complexity (two tiers of complexity) is required. However, to turn on the first tap of FIG. 6 (with all switches off except switches $S_1$, $S_{11}$, $S_{111}$ and $S_{1111}$), decoding logic of greater complexity (four tiers of complexity) is required.

The cost of implementing the inventive scheme is the extra complexity of the decoding logic needed for each tier of switches of each segmented array of switches included therein. This cost is expected to be very low in typical applications (it is expected to be trivial in typical multiple-gain block applications) because with CMOS scaling, the necessary die area becomes less expensive.

Examples of implementations of the invention are: a variable gain amplifier in which the selectable gain ranges from gain=1 to gain=5.6 in 64 linear steps; and another variable amplifier in which the selectable gain ranges from gain=1 to gain=5 in 128 linear steps. The variable amplifier with 64 gain steps can be realized with a segmented switch array having four tiers of switches (i.e., with nodes of degree D=1, D=2, D=3, and D=4), and the amplifier with 128 gain steps can be realized with a segmented switch array having eight tiers of switches (i.e., with nodes of degree D=1 through D=8). To provide switch control signals for these two implementations, 6-to-64 and 7-to-128 decoders were used, respectively.

Figure 7:
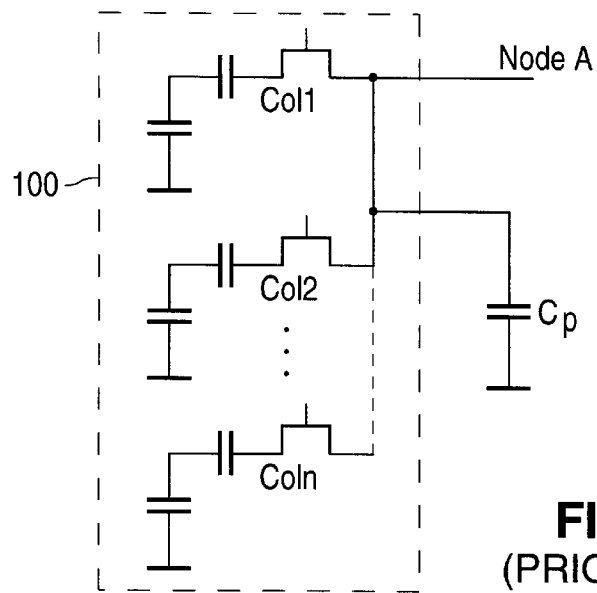
FIG. 7 is a schematic diagram of a portion of a conventional correlated double sampling circuit including a column of switches (MOSFET devices $Col_1$–$Col_n$).

In other embodiments of the inventions, a long array of switches (coupled to a node) is replaced by a segmented array of switches, to reduce the parasitic capacitance from the switches at the node, thereby reducing the adverse effect on performance due to the parasitic capacitance. For example, in a conventional correlated double sampling circuit (such as CDS 100 of FIG. 7) of a type useful in an active pixel sensor cell array circuit for reading cells of the pixel sensor cell array, an entire column of switches $Col_1$–$Col_n$ (each implemented as a MOSFET device) creates a substantial parasitic capacitance (indicated by the symbol $C_p$) at Node A. This parasitic acts as a capacitor voltage divider and will attenuate the signal at node A depending on how many switches are included in the column (i.e., depending on how large is the integer "n").

Figure 8:
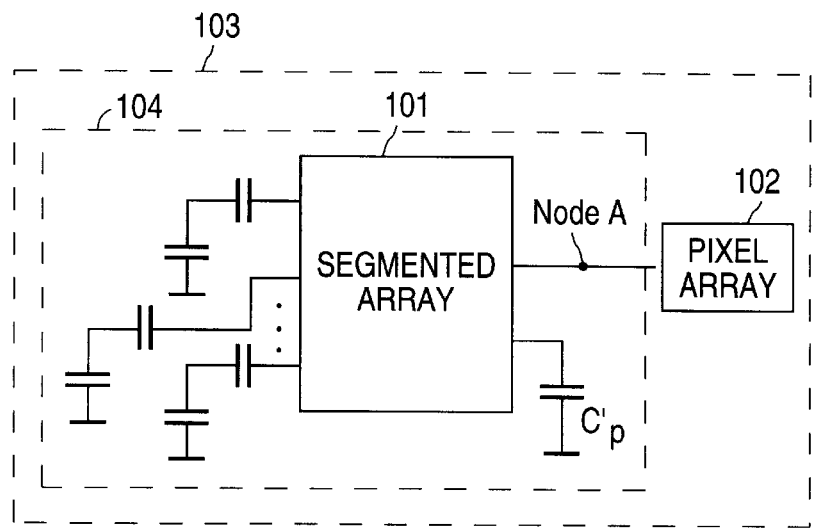
FIG. 8 is a block diagram of an active pixel sensor cell circuit including a correlated double sampling circuit which embodies the present invention and differs from the FIG. 7 circuit in that switches $Col_1$–$Col_n$ of FIG. 7 are replaced by segmented array (array 101) of switches of FIG. 8.

FIG. 8 is an integrated active pixel sensor cell array circuit (active pixel sensor cell array chip) 103, including pixel sensor cell array 102 (comprising rows and columns of active pixel sensor cells) and correlated double sampling circuit (CDS) 104. CDS 104 is a modified version of the FIG. 7 circuit in which column of switches $Col_1$–$Col_n$ (of FIG. 7) is replaced by a segmented array 101 of switches (in accordance with the invention). Segmented array 101 has reduced parasitic capacitance $C'_p$, which is significantly less than parasitic capacitance $C_p$ of FIG. 7, so that the FIG. 8 circuit has significantly less attenuation at node A than does the FIG. 7 circuit. Each cell of array 102 can be read to determine the level of radiation incident thereon. Chip 103 includes a set of correlated double sampling circuits (CDS's), including one CDS for reading each column of cells, but only one such CDS (CDS 104) is shown in FIG. 8. Node A of segmented switch array 101 is coupled to one column of pixel array 102.

Another aspect of the invention is a method for designing an integrated circuit to have reduced load capacitance (e.g., load capacitance due to parasitic capacitance) at at least one sensitive node, including the steps of: (a) identifying a sensitive node of a preliminary design for the circuit, wherein the preliminary design specifies that an array of switches is coupled to the sensitive node, and the preliminary design imposes a first total load capacitance at the sensitive-node; and (b) determining a refined design for the circuit which specifies that the array is replaced by a segmented switch array comprising switches connected between nodes having a tree structure, wherein said nodes include a root node, the root node is the sensitive node, and the refined design reduces the total load capacitance at the sensitive node to a second total load capacitance that is less than a predetermined value (wherein the second total load capacitance is less than the first total load capacitance). In preferred embodiments, the segmented switch array has at least two primary segments, each of the primary segments includes a primary switch and a node of a first degree (a node having degree D=1 relative to the root node), and at least one of the primary segments has multiple secondary segments, each of the secondary segments including a secondary switch and a node of a second degrees (a node having degree D=2 relative to the root node).

Although only a number of embodiments have been described in detail herein, those having ordinary skill in the art will certainly understand that many modifications are possible without departing from the teachings hereof. All such modifications are intended to be encompassed within the following claims.

What is claimed is:

1. An integrated circuit, comprising:
   circuitry having a first node, where the first node has a potential which varies with time, within a frequency bandwidth, during operation; and
   a segmented array of switches having a root node, wherein the segmented array of switches is coupled to the first node such that said first node is the root node, wherein the circuitry and the segmented array of switches have a transfer function, the transfer function has a pole, and the segmented array is implemented so as to reduce total load capacitance at the first node and move the pole outside the bandwidth.

2. The integrated circuit of claim 1, wherein the segmented array comprises switches connected between a set of nodes having a tree structure, and wherein the set of nodes includes the root node and additional nodes of at least two different degrees relative to the root node.

3. The integrated circuit of claim 1, also including additional circuitry, wherein the segmented array has at least two primary segments connected in parallel between the first node and the additional circuitry, each of the primary segments includes a primary switch and a node of first degree relative to the root node, and at least one of the primary segments includes at least two secondary segments connected in parallel between one said node of first degree and the additional circuitry, each of the secondary segments including a secondary switch and a node of second degree relative to the root node.

4. The integrated circuit of claim 3, wherein the additional circuitry is an array of series-connected resistors.

5. The integrated circuit of claim 1, also including a second node, wherein the segmented array has at least two primary segments connected in parallel between the first node and the second node, each of the primary segments includes a primary switch and a node of first degree relative to the root node, and at least one of the primary segments includes at least two secondary segments connected in parallel between one said node of first degree and the second node, each of the secondary segments including a secondary switch and a node of second degree relative to the root node.

6. The integrated circuit of claim 1, wherein said integrated circuit is an analog integrated circuit operable at high speed such that the potential at the first node varies rapidly.

7. The integrated circuit of claim 1, wherein the circuitry includes at least one multiple-gain block comprising:
   an amplifier having a first input terminal coupled to receive an input signal, a second input terminal, and an output terminal, wherein the second input terminal is the first node; and
   an array of resistors,
   wherein the segmented array has at least two primary segments connected in parallel between the first node and the array of resistors, each of the primary segments includes a primary switch and a node of first degree relative to the root node, and at least one of the primary segments includes at least two secondary segments connected in parallel between one said node of first degree and the array of resistors, each of the secondary segments including a secondary switch and a node of second degree relative to the root node.

8. The integrated circuit of claim 1, wherein said integrated circuit includes a correlated double sampling circuit, and the correlated double sampling circuit includes said first node and said segmented array of switches.

9. An integrated circuit, comprising:

circuitry having a sensitive node, wherein the sensitive node has a potential which varies with time, within a frequency bandwidth, during operation of the integrated circuit, and wherein there is a total load capacitance at the sensitive node; and a segmented switch array coupled to the sensitive node, wherein the segmented switch array comprises switches connected between nodes having a tree structure, wherein said nodes include a root node, the root node is the sensitive node, the circuitry and the segmented switch array have a transfer function, the transfer function has a pole, and the segmented switch array is implemented so that the total load capacitance at the sensitive node is reduced and the pole is moved outside the bandwidth.

10. The integrated circuit of claim 9 wherein the segmented switch array has at least two primary segments, each of the primary segments includes a primary switch and a node of a first degree relative to the root node, and at least one of the primary segments has multiple secondary segments, each of the secondary segments including a secondary switch and a node of a second degrees relative to the root node.

11. The integrated circuit of claim 9, wherein said integrated circuit includes a correlated double sampling circuit, and the correlated double sampling circuit includes said sensitive node and said segmented switch array.

12. A method for designing an integrated circuit to have reduced total load capacitance at at least one sensitive node, said method including the steps of:

(a) identifying a sensitive node of a preliminary design for the circuit, wherein the preliminary design specifies that the circuit includes circuitry including the sensitive node, and that the sensitive node has a potential which varies with time, within a frequency bandwidth, during operation of the circuitry, the preliminary design specifies that an array of switches is coupled to the sensitive node, and the preliminary design imposes a first total load capacitance at the sensitive node; and (b) determining a refined design for the circuit which specifies that the array is replaced by a segmented switch array comprising switches connected between nodes having a tree structure, wherein said nodes include a root node, the root node is the sensitive node, and the refined design requires that the circuitry and the segmented switch array have a transfer function, the transfer function has a pole outside the bandwidth, and the refined design reduces the total load capacitance at the sensitive node to a second total load capacitance, wherein the second total load capacitance is less than a predetermined value.

13. The method of claim 12, wherein step (b) includes the step of determining the refined design so that the segmented switch array has at least two primary segments, each of the primary segments includes a primary switch and a node of a first degree relative to the root node, and at least one of the primary segments has multiple secondary segments, each of the secondary segments including a secondary switch and a node of a second degrees relative to the root node.

14. A method for operating an integrated circuit including circuitry having a first node at a first potential, and a segmented array of switches having a root node, wherein the segmented array of switches is coupled to the first node such that the first node is the root node, and the circuitry and the segmented array of switches have a transfer function having a pole, said method including a step of:

varying the first potential with time, within a frequency bandwidth, during operation without causing any switch of the segmented array of switches to change state, wherein the segmented array of switches is implemented so as to significantly reduce parasitic capacitance at the first node and to cause the pole to be outside the bandwidth.

15. An integrated circuit, comprising:

circuitry having a first node; and a segmented array of switches connected between a set of nodes having a tree structure, said nodes including at least a root node, secondary nodes, and tertiary nodes, wherein the segmented array of switches is coupled to the first node such that said first node is the root node, the segmented array has at least two primary segments between the root node and the tertiary nodes, each of the primary segments includes a primary switch and a different one of the secondary nodes, at least one of the primary segments includes at least two secondary segments connected between one of the secondary nodes and the tertiary nodes, and each of the secondary segments includes a secondary switch and a different one of the tertiary nodes, wherein the first node has a potential that varies with time, within a frequency bandwidth, during operation of the integrated circuit without any switch of the segmented array of switches changing state, wherein the circuitry and the segmented array have a transfer function having a pole, and the segmented array is implemented so as to cause the pole to be outside the bandwidth.

16. The integrated circuit of claim 15, also including additional circuitry, wherein said tertiary nodes are separated nodes of said additional circuitry.

17. The integrated circuit of claim 16, wherein the additional circuitry is an array of series-connected resistors.

18. The integrated circuit of claim 16, wherein the additional circuitry comprises capacitors but not resistors.

19. The integrated circuit of claim 15, wherein said integrated circuit includes a correlated double sampling circuit, and the correlated double sampling circuit includes said first node and the segmented array of switches.

20. The integrated circuit of claim 19, also including additional circuitry, wherein said tertiary nodes are separated nodes of said additional circuitry, and the additional circuitry comprises capacitors but not resistors.

21. An integrated circuit, comprising:

a first node; and a segmented array of switches connected between a set of nodes having a tree structure, said nodes including at least a root node, secondary nodes, and tertiary nodes, wherein the segmented array of switches is coupled to the first node such that said first node is the root node, the segmented array has at least three primary segments between the root node and the tertiary nodes, each of the primary segments includes a primary switch and a different one of the secondary nodes, at least one of the primary segments includes at least two secondary segments connected between one of the secondary nodes and the tertiary nodes, and each of the secondary segments includes a secondary switch and a different one of the tertiary nodes, wherein the first node has a potential that varies with time during operation of the integrated circuit without any switch of the segmented array of switches changing state.

22. A method for operating an integrated circuit having a first node at a first potential and a segmented array of switches having a root node, wherein the segmented array of switches is coupled to the first node such that the first node is the root node, and the segmented array of switches is implemented so as to reduce total load capacitance at the first node to a desired level, wherein the integrated circuit includes at least one multiple-gain block having a transfer function and comprising an amplifier and an array of resistors, the amplifier has a first input terminal coupled to receive an input signal and a second input terminal, the second input terminal is the first node, the segmented array also includes secondary nodes and tertiary nodes, the segmented array has at least two primary segments between the root node and the tertiary nodes, each of the primary segments includes a primary switch and a different one of the secondary nodes, at least one of the primary segments includes at least two secondary segments connected between one of the secondary nodes and the tertiary nodes, and each of the secondary segments includes a secondary switch and a different one of the tertiary nodes, said method including a step of:

varying the first potential with time during operation, so as to cause said first potential to vary with frequency within a bandwidth, wherein the segmented array is implemented so as cause the transfer function to have a pole outside the bandwidth.

* * * * *